(12) United States Patent
Hessling-Von Heimendahl et al.

(10) Patent No.: US 10,082,285 B2
(45) Date of Patent: Sep. 25, 2018

(54) EXTERIOR AIRCRAFT LIGHT UNIT

(71) Applicant: Goodrich Lighting Systems GmbH, Lippstadt (DE)

(72) Inventors: Andre Hessling-Von Heimendahl, Koblenz (DE); Andreas Gausepohl, Anroechte (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/347,921

(22) Filed: Nov. 10, 2016

(65) Prior Publication Data
US 2017/0138584 A1 May 18, 2017

(30) Foreign Application Priority Data

Nov. 13, 2015 (EP) .................................... 15194543

(51) Int. Cl.
| F21V 31/00 | (2006.01) |
| F21V 29/89 | (2015.01) |
| B64D 47/02 | (2006.01) |
| F21V 3/00 | (2015.01) |
| F21V 31/03 | (2006.01) |
| B64D 47/04 | (2006.01) |
| B64D 47/06 | (2006.01) |
| F21S 45/30 | (2018.01) |
| F21Y 115/10 | (2016.01) |
| B01D 53/26 | (2006.01) |
| B01D 53/28 | (2006.01) |
| F21Y 101/00 | (2016.01) |
| F21W 107/30 | (2018.01) |

(52) U.S. Cl.
CPC ............ *F21V 31/005* (2013.01); *B64D 47/02* (2013.01); *B64D 47/04* (2013.01); *B64D 47/06* (2013.01); *F21S 45/30* (2018.01); *F21V 3/00* (2013.01); *F21V 29/89* (2015.01); *F21V 31/03* (2013.01); *B01D 53/263* (2013.01); *B01D 53/28* (2013.01); *B01D 2259/4575* (2013.01); *F21W 2107/30* (2018.01); *F21Y 2101/00* (2013.01); *F21Y 2115/10* (2016.08)

(58) Field of Classification Search
CPC ..... B64D 47/06; B64D 2203/00; F21V 29/89; F21V 7/04
See application file for complete search history.

(56) References Cited

U.S. PATENT DOCUMENTS

| 2006/0150817 | A1 | 7/2006 | Deguiseppi |
| 2007/0091607 | A1 | 4/2007 | Powell |
| 2009/0122570 | A1 | 5/2009 | Hsu |
| 2017/0074556 | A1* | 3/2017 | Shin ........................ F25B 21/04 |

FOREIGN PATENT DOCUMENTS

WO 9727042 A1 7/1997

OTHER PUBLICATIONS

European Search Report for Application No. 15194543.3-1756. dated May 12, 2016 6 pages.

* cited by examiner

*Primary Examiner* — Anne Hines
(74) *Attorney, Agent, or Firm* — Cantor Colburn LLP

(57) ABSTRACT

An exterior aircraft light unit comprises a housing defining an interior space for accommodating at least one light source; and a hygroscopic material, which is arranged inside the interior space for absorbing water and/or moisture from inside the interior space.

15 Claims, 2 Drawing Sheets

EXTERIOR AIRCRAFT LIGHT UNIT

FOREIGN PRIORITY

This application claims priority to European Patent Application No. 15 194 543.3 filed Nov. 13, 2015, the entire contents of which is incorporated herein by reference.

TECHNICAL FIELD

The present invention relates to an exterior aircraft light unit comprising at least one light source, in particular to an exterior aircraft light unit which is configured for preventing condensation within its housing.

BACKGROUND

Almost all aircraft are equipped with exterior lights. In particular, large passenger air planes are provided with a wide variety of exterior lights. Examples of such lights include navigation or position lights, beacon lights, anti-collision lights or strobe lights, wing lights, taxi lights, landing lights, runway turnoff lights, etc. All of these lights are respectively provided with at least one light source.

In the past exterior aircraft lights had been equipped with high power incandescent lamps operating at high temperatures. Today's exterior aircraft lights often employ LED light sources. LED light sources do not nearly get as hot as incandescent lamps and therefore are not as efficient in evaporating water and moisture from inside the housing of the aircraft light as incandescent lamps.

Thus, using exterior aircraft lights in humid ambient conditions may lead to humid air ingressing into the housing and eventually to water condensing on a cover lens, in particular when the light cools off after operation. For lights having body mounted LEDs, such a situation is especially prominent as the back-side is thermally insulated and the lens cools off faster than any other part of the housing. Condensed water is considered an issue, as the water droplets modify the light distribution and minimum intensity requirements on the illuminated area might no longer be achieved.

It therefore would be beneficial to provide an exterior aircraft light unit which allows for reducing the risk of condensation within its housing.

SUMMARY

Exemplary embodiments of the invention include an exterior aircraft light unit comprising a housing which defines an interior space for accommodating at least one light source; and a hygroscopic material, which is arranged in fluid communication with the interior space for absorbing water and/or moisture from inside the interior space.

Exemplary embodiments of the invention further include a method of removing water and/or moisture from an interior space of an exterior aircraft light unit including the steps of placing a hygroscopic material in fluid communication with the interior space and absorbing the water and/or moisture from the interior space by the hygroscopic material.

By placing a hygroscopic material in fluid communication with the interior space of the housing, water and/or moisture entering the interior space is absorbed by the hygroscopic material and condensation inside the housing, in particular on a lens, which is integrated into the housing, is reliably prevented. In consequence, a deterioration of the light emission provided by the exterior aircraft light unit is avoided, even when it is operated under humid conditions.

In an embodiment, the hygroscopic material is placed within the interior space of the housing for absorbing water and/or moisture directly from said interior space. This provides a simple configuration, in which the hygroscopic material is safely housed within the interior space and being protected from adverse external influences.

In another embodiment, the hygroscopic material is placed outside but in fluid communication with the interior space of the housing. The hygroscopic material e.g. may be provided in an additional space provided next to the interior space, the additional space and the interior space being fluidly connected by at least one opening, channel or duct allowing an exchange of air between the interior space and the additional space. The additional space may be an additional compartment, next to the housing defining the interior space. Such a configuration allows replacing the hygroscopic material without opening the interior space. Also, such an additional space, containing the hygroscopic material, may be easily retro-fitted onto existing exterior aircraft light units.

The hygroscopic material may be placed in an opening, channel, or duct which fluidly connects the interior space with the exterior of the housing. Such a configuration allows for a very efficient dehumidification of air entering into the interior space from the outside the housing.

In one embodiment the hygroscopic material comprises a silica gel. Such a silica gel, which for example is know as Tyvex®, may be provided in a bag, which is permeable to air. Such a silica gel provides an efficient and cost-efficient hygroscopic material, which is well suited for being used in an exterior aircraft light unit according to exemplary embodiments of the invention.

According to a further embodiment, the exterior aircraft light unit comprises at least one light source accommodated within the housing, and the at least one light source comprises at least one LED. In particular, the exterior aircraft light unit may comprise a row of LEDs or a two-dimensional array of LEDs.

In one embodiment, the exterior aircraft light unit further comprises at least one light source accommodated within the housing, and the hygroscopic material is arranged next to the at least one light source. In such a configuration, the hygroscopic material is heated by the thermal energy produced by the light source in operation for calcinating the humidity from the hygroscopic material. This process regenerates the hygroscopic material for allowing to absorb more humidity after the at least one light source has been switched off and temperatures go down again.

In one embodiment, a heat conducting material is placed between the hygroscopic material and the at least one light source in order to enhance the transfer of heat from the at least one light source to the hygroscopic material. The heat conducting material may comprise a heat conducting resin, which may act as an adhesive for fixing the position of the hygroscopic material and/or the at least one light source. Alternatively or additionally, the heat conducting material may comprise at least one metal in order to improve its heat conducting properties.

In one embodiment, the exterior aircraft light unit comprises at least one opening for providing a defined air flow path between the interior and the exterior of the housing. Such an opening allows venting the interior space in order to remove water and moisture from inside the housing.

In one embodiment, a liquid-moisture-barrier is provided next to or within the opening. Said liquid-moisture-barrier in particular may comprise a semi-permeable membrane which allows wet air to exit the interior space and prevents water and moisture from getting into the interior space. Such a liquid-moisture barrier enhances the efficiency of the hygroscopic material as the amount of moisture to be absorbed from the interior space is considerably reduced, but humidity absorbed within the hygroscopic material still may be calcinated to the exterior, as it is allowed to pass the liquid-moisture-barrier. The semi-permeable membrane in particular may comprise a GoreTex® membrane or a membrane made from material having similar semi-permeable properties.

In one embodiment, the hygroscopic material is arranged next to or within the opening. Arranging the hygroscopic material next to or within the opening allows for an efficient dehumidification of air entering into the interior space via the opening. It further allows to efficiently calcinate the humidity absorbed by the hygroscopic material to the exterior via the opening.

In one embodiment, the hygroscopic material is arranged on the side of the liquid-moisture-barrier facing the interior space of the housing. Such a configuration avoids water and moisture from reaching the hygroscopic material from the exterior. In consequence, the hygroscopic material is not loaded with water and/or moisture from outside the housing and the efficiency of the hygroscopic material is enhanced. As a result, less hygroscopic material is needed for absorbing water and moisture from the interior space and the weight as well as the costs of the exterior aircraft light unit may be reduced.

In one embodiment, the exterior aircraft light unit comprises between 1 gram and 10 grams, in particular between 3 grams and 8 grams, more particular between 5 and 6 grams of hygroscopic material per liter volume of the interior space of the housing. This amount of hygroscopic material has proven as a reasonable compromise between providing a large amount of moisture absorbing capacity and limiting the additional weight and volume as well as costs of the exterior aircraft light unit.

In one embodiment, the exterior aircraft light unit further comprises an at least partially transparent cover for allowing light to be emitted from inside the housing. In one embodiment, the at least partially transparent cover is at least partially formed as a lens, which is configured for shaping the light beam emitted from inside the housing when the at least one light source is operated. In an exterior aircraft light unit according to an exemplary embodiment of the invention, condensation of water on the inside of the transparent cover facing the interior of the exterior aircraft light unit, which might deteriorate the light emitting properties of the exterior aircraft light unit, is reliably avoided. In consequence, the operational safety of the exterior aircraft light unit is considerably enhanced.

In an embodiment, the method of removing water and/or moisture from an interior space of an exterior aircraft light unit includes the step of regenerating the hygroscopic material by heating the hygroscopic material. Through regeneration the hygroscopic material is configured for repeatedly absorbing humidity from the interior of the exterior aircraft light unit. Thus, there is no need for replacing the hygroscopic material. Instead, the hygroscopic material may be used for a plurality of absorbing cycles/operating cycles of the exterior aircraft light unit.

In an embodiment, the hygroscopic material is heated by the heat which is produced by operating the exterior aircraft light unit. This allows for a very effective heating of the hygroscopic material.

In an embodiment, the step of regenerating the hygroscopic material includes delivering air from the interior space of the exterior aircraft light unit to the exterior through the hygroscopic material and a liquid-moisture-barrier. This allows for a very effective regeneration of the hygroscopic material.

In an embodiment, the liquid-moisture-barrier in particular comprises a semi-permeable membrane providing a very effective liquid-moisture-barrier.

BRIEF DESCRIPTION OF THE DRAWINGS

Exemplary embodiments of the invention are described in greater detail below with reference to the enclosed figures.

DETAILED DESCRIPTION

Figure 1:
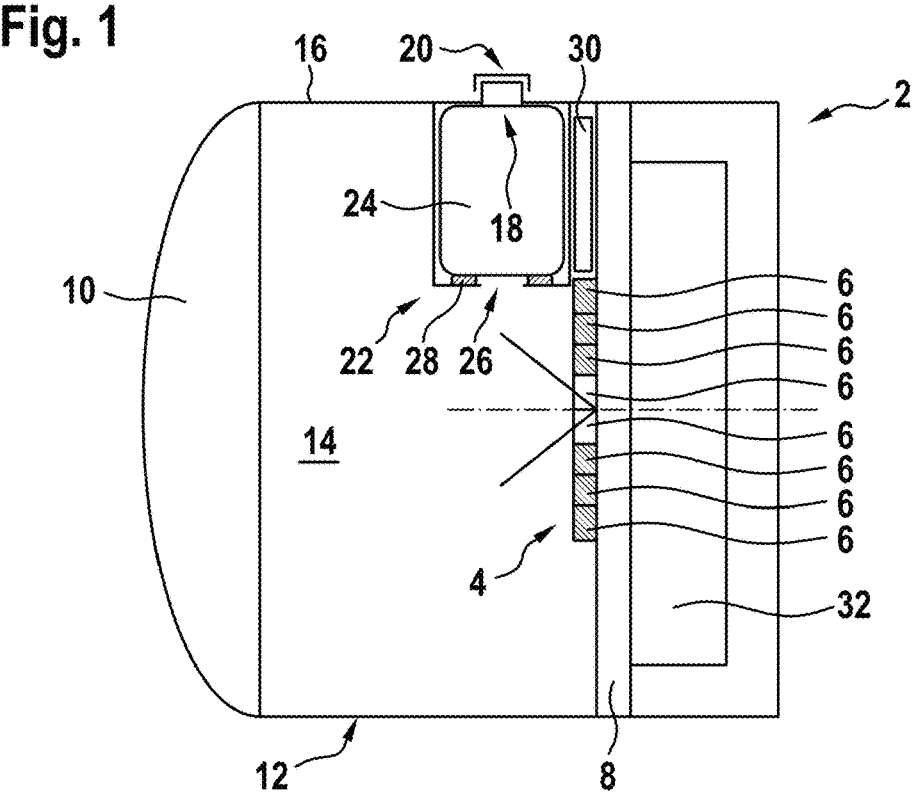
FIG. 1 shows a schematic cross-sectional view of an exterior aircraft light unit according to an exemplary embodiment of the invention.

An exterior aircraft light unit 2 according to an exemplary embodiment of the invention, as it is shown in FIG. 1, comprises a housing 12. At least one side of the housing 12 is formed as a transparent external cover 10, which is formed of a lens and may also be referred to as lens cover 10. A structural wall 8 supporting a light source 4 is arranged opposite to the transparent external cover 10 defining an interior space 14 between the transparent external cover 10 and the structural wall 8. An electric control circuit 32, which is configured for controlling the operation of the light source 4, is arranged on a rear side of the structural wall 8 facing away from the interior space 14.

In the exemplary embodiment shown in FIG. 1, the light source 4 is provided as a light source arrangement comprising a plurality of light emitting elements 6, which are arranged next to each other. In an alternative embodiment, which is not shown in the Figures, the light source 4 may comprise only a single light emitting element 6.

The light emitting elements 6 in particular may be arranged in a one dimensional strip, as a two-dimensional array/matrix structure, or in any other pattern which is suitable for generating the desired light emission. The light emitting elements 6 may be embodied as LEDs providing highly efficient light emitting elements 6. Depending on the function of the exterior aircraft light unit 2, the light emitting elements 6 may be configured for emitting light of the same color, or they may be configured for emitting light of different colors.

A side wall 16 of the housing 12 extending between the transparent external cover 10 and the structural wall 8 is provided with a tubular opening 18 providing an air flow passage between the interior space 14 and the outside of the exterior aircraft light unit 2. The outer end of the tubular opening 18 is sealed by a liquid moisture-barrier 20. The liquid-moisture-barrier 20, which in particular may be provided as a semi-permeable membrane, is configured for allowing wet air to exit from the interior space 14. It is also configured for preventing water and/or moisture from getting into the interior space 14 via the opening 18.

A support structure 22 is formed next to the opening 18 within the interior space 14. The support structure 22 supports an amount of hygroscopic material 24, in particular a silica gel provided in a bag which is permeable to air. The hygroscopic material 24 absorbs moisture from the air within the interior space 14 via an opening 26 which is formed within the support structure 22.

A sealing element 28, e.g. an O-ring, seals the interface between the hygroscopic material 24 and the support structure 22 in order to avoid air from bypassing the hygroscopic material 24.

A heat conducting element 30 is arranged on the structural wall 8 next to the support structure 22 facing the interior space 14. The heat conducting element 30 provides a thermal connection between the hygroscopic material 24 and the light source 4 for enhancing the transfer of heat from the light source 4 to the hygroscopic material 24. The heat conducting element 30 in particular may comprise a heat conducting resin, which may further act as an adhesive fixing the support structure 22 to the structural wall 8. Alternatively or additionally, the heat conducting element 30 may comprise a metal for improving its heat conducting properties. The heat conducting element 30 may be configured to contact the light source 4, as well, in order to provide a heat-bridge between the light source 4 and the hygroscopic material 24. The heat conducting element 30 may also conduct heat from the electric control circuit 32 to the hygroscopic material 24.

Figure 2:
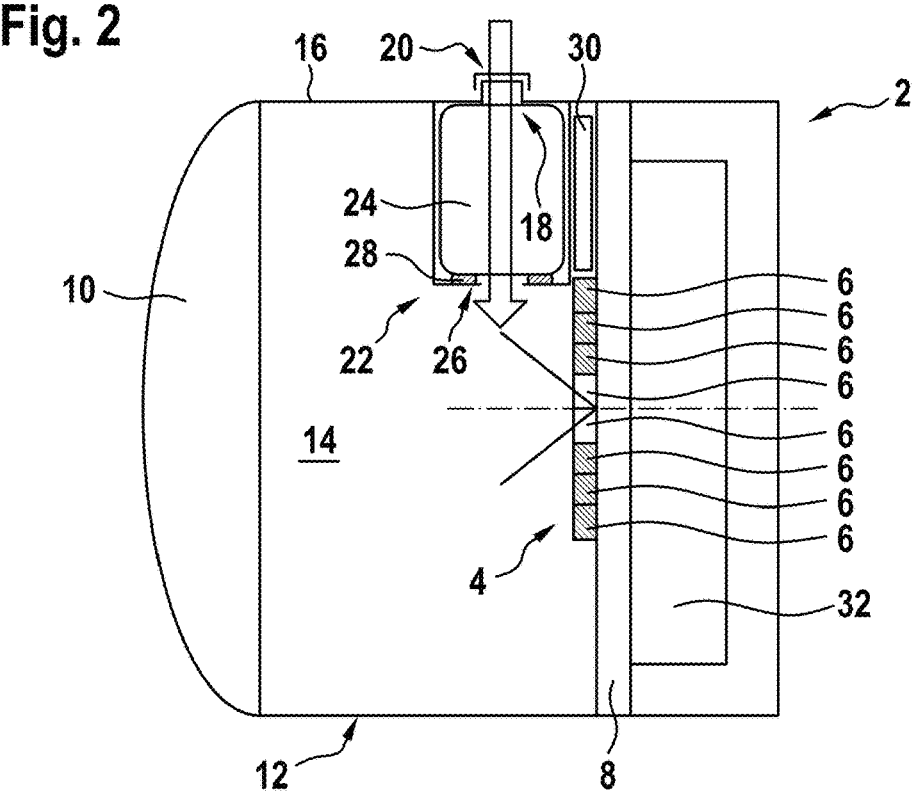
FIG. 2 schematically illustrates a first operational state of an exterior aircraft light unit according to an exemplary embodiment of the invention, in an operational state in which the light source is not operating, FIG. 3 schematically illustrates a second operational state of an exterior aircraft light unit according to an exemplary embodiment of the invention, in an operational state in which the light source is operating.

FIG. 2 schematically illustrates a first operational state of an exterior aircraft light unit 2 according to an exemplary embodiment of the invention, in which the light source 4 is not operating. FIG. 2 in particular illustrates a state, in which the light source 4 has been switched off after operation and the interior space 4 of the exterior aircraft light unit 2 is cooling down causing the air pressure within the interior space 14 to decrease.

In such a state, air from outside the exterior aircraft light unit 2 enters into the interior space 14 via the openings 18, 26 passing both, the liquid-moisture barrier 20 and the hygroscopic material 24. The liquid-moisture-barrier 20 blocks any water and moisture from entering into the interior space 14. Vapor and humidity comprised within the air passing the liquid-moisture-barrier 20 are absorbed by the hygroscopic material 24. As a result, the humidity within the interior space 14 remains low and undesirable condensation on the transparent cover 10 and/or the light source 4 can be avoided.

When the pressure within the interior space 14 is equal to the outside air pressure, the flow of air into the interior space 14 stops. In this state, humidity, which is still present within the interior space 14, is absorbed by the hygroscopic material 24 decreasing the humidity within the interior space 14 even further.

Humidity within the housing 12 may also be the result of non-perfectly sealed connections between the parts of the exterior aircraft light unit 2. The humidity entering the housing 12 through any kind of slots and cracks is also absorbed by the hygroscopic material 24.

Figure 3:
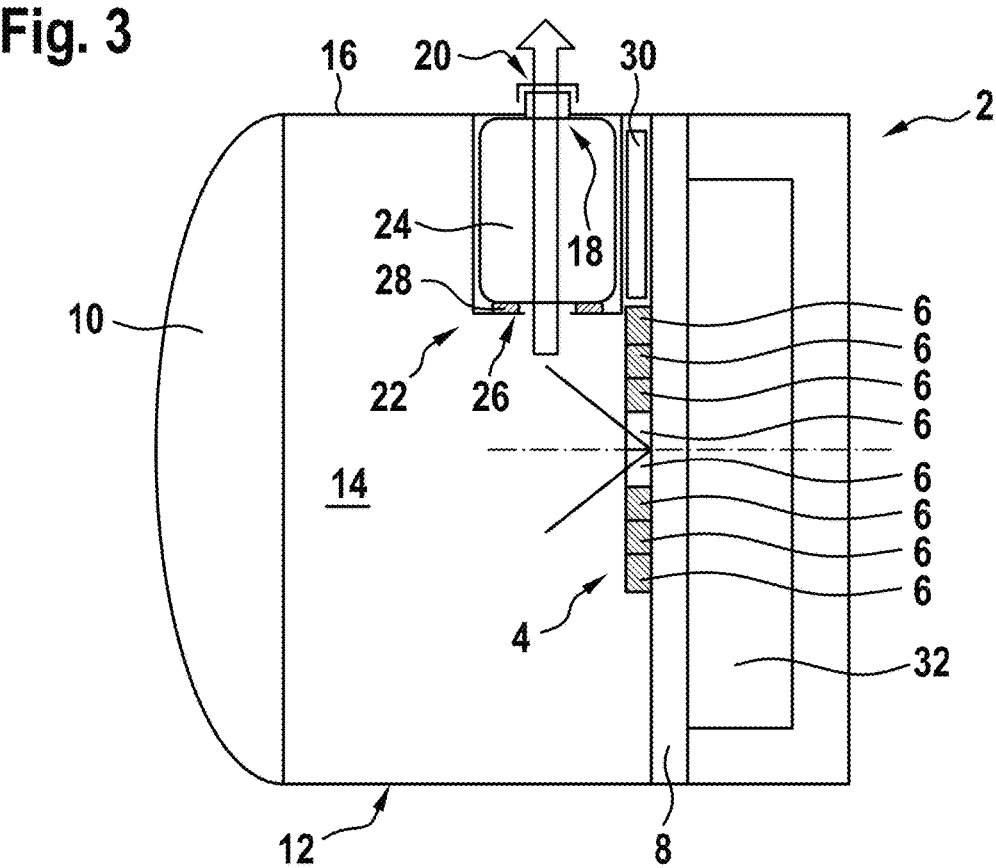

FIG. 3 schematically illustrates a second operational state, in which the light source 4 is operating. Although LEDs, as they are used in today's exterior aircraft lights, do not nearly get as hot as the incandescent lamps, which have been used in the past, still some amount of heat is generated by the light source 4 and the control circuit 32 when operating.

This heat results in an increase of pressure within the interior space 14 generating a flow of air from the interior space 14 through the openings 18, 26 to the exterior.

At the same time, the hygroscopic material 24 is heated by the heat generated when operating the light source 4 and the control circuit 32. Transfer of heat from the light source 4 and/or the control circuit 32 to the hygroscopic material 24 is enhanced by the heat conducting element 30. When heated, the hygroscopic material 24 dispenses the humidity, which has been absorbed in the first operational state, as it has been described before, to the flow of air flowing therethrough. As a result, the humidity, which has been stored within the hygroscopic material 24 during the first operational state, is delivered to the exterior. This regenerates the hygroscopic material 24 for allowing to absorb new humidity again when the light source 4 is switched off and the exterior aircraft light unit 2 returns to the first operational state, as it has been described with respect to FIG. 2.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An exterior aircraft light unit comprising:
   a housing defining an interior space for accommodating at least one light source;
   a hygroscopic material, which is arranged in fluid communication with the interior space for absorbing water and/or moisture from inside the interior space;
   at least one opening which is configured for venting the interior space; and
   a liquid-moisture barrier arranged next to or within the at least one opening;
   wherein the hygroscopic material is arranged next to or within the at least one opening so that air entering or leaving the interior space passes both, the liquid-moisture-barrier and the hygroscopic material.

2. The exterior aircraft light unit of claim 1, wherein the hygroscopic material comprises a silica gel.

3. The exterior aircraft light unit of claim 1, further comprising at least one light source accommodated within the housing.

4. The exterior aircraft light unit of claim 3, wherein the hygroscopic material is arranged next to the at least one light source.

5. The exterior aircraft light unit of claim 4, further comprising a heat conducting material arranged between the hygroscopic material and the at least one light source.

6. The exterior aircraft light unit of claim 1, wherein the liquid-moisture-barrier comprises a semi-permeable membrane.

7. The exterior aircraft light unit of claim 1, wherein the hygroscopic material is arranged on the side of the liquid-moisture-barrier facing the interior space of the housing.

8. The exterior aircraft light unit of claim 1 comprising 1 gram to 10 grams, of hygroscopic material per liter volume of the interior space.

9. The exterior aircraft light unit of claim 1, further comprising an at least partially transparent cover, which allows light to be emitted from inside the housing, wherein the at least partially transparent cover in particular is at least partially formed as a lens.

10. A method of removing water and/or moisture from an interior space of an exterior aircraft light unit including the steps of:
  placing a hygroscopic material in fluid communication with the interior space next to or in at least one opening which is configured for venting the interior space;
  passing air entering or leaving the interior space through a liquid-moisture barrier and through the hygroscopic material; and
  absorbing the water and/or moisture by the hygroscopic material.

11. The method of claim 10 further including the step of regenerating the hygroscopic material by heating the hygroscopic material.

12. The method of claim 11, wherein the step of regenerating the hygroscopic material includes delivering air from the interior space of the exterior aircraft light unit to the exterior through the hygroscopic material and a liquid-moisture-barrier.

13. The method of claim 12, wherein the liquid-moisture-barrier comprises a semi-permeable membrane.

14. The method of claim 10, wherein the hygroscopic material is heated by the heat which is produced by operating the exterior aircraft light unit.

15. The method of claim 10, wherein the liquid-moisture-barrier comprises a semi-permeable membrane.

\* \* \* \* \*